3,098,067
3,3-DISUBSTITUTED-2,4-AZETIDINEDIONE COMPOUNDS
Emilio Testa, San Simone, Vacallo, Canton of Ticino, Switzerland, assignor to Lepetit S.p.A., Milan, Italy
No Drawing. Filed June 6, 1960, Ser. No. 33,932
Claims priority, application Great Britain July 7, 1959
9 Claims. (Cl. 260—239)

The present invention is concerned with pharmacologically useful compounds and a process for their preparation. More particularly, the invention is concerned with 3,3-disubstituted 2,4-azetidinediones of the formula

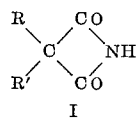

I wherein R and R' are the same or different and represent lower linear or branched alkyl, cycloalkyl, aryl, aralkyl or heterocyclic radicals.

The compounds of the invention have proved particularly active as hypnotics of short lasting effect. Moreover, they are useful as intermediates for preparing N-substituted 2,4-azetidinediones (II) and 3-disubstituted azetidinediones (III), of which the former have been proved pharmacologically useful an antiphlogistics by Ebnöter et al., [Helv. Chim. Acta, 42, 918 (1959)], the latter being the subject of copending applications Serial No. 860,311, filed December 12, 1959; Serial No. 860,312, filed December 12, 1959; Serial No. 860,325, filed December 18, 1959, now U.S. Patent 3,037,019; Serial No. 860,314, filed December 18, 1959; and Serial No. 860,313, filed December 18, 1959, now U.S. Patent 3,028,378.

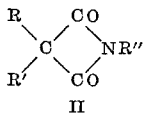 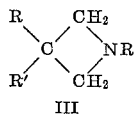

II III

The process for the preparation of the compounds of the invention consists in reacting an α,α-disubstituted malonamic acid with excess thionyl chloride in an inert anhydrous organic solvent, e.g. benzene, in the presence of a tertiary amine base, which may be aliphatic or heterocyclic, evaporating the reaction mixture to dryness, taking up the residue with water and extracting with an organic solvent immiscible with water. The organic extract is then evaporated to dryness giving the desired compound, which may be distilled or recrystallised from a solvent, according to what is best made in view of its physical properties.

From the new azetidinediones of the invention the N-substituted 2,4-azetidinones of Formula II are prepared by treatment with an excess over an equivalent amount of a diazoalkane R''N$_2$ in which R'' represents a lower alkyl radical, in an inert organic solvent, such as diethyl ether or dioxane at room temperature for a period of 2–10 hours. The solvent is then removed in vacuo and the residue is distilled giving the desired N-alkylated 3,3-disubstituted 2,4-dione in good yield.

The preparation of the 3,3-disubstituted azetidines of Formula III is best provided by hydrogenating the 3,3-disubstituted 2,4-azetidinediones of the invention with an excess over the theoretical amount of lithium aluminium hydride in an inert anhydrous organic solvent, such as diethyl ether or dioxane, at a temperature between the room temperature and the boiling point of the selected solvent.

The following examples are illustrative of the invention.

*Example 1*

Into a mixture of 7.2 g. of α-phenyl-α-ethylmalonamic acid and 29 ml. of thionyl chloride 2.9 g. of anhydrous pyridine are dropped over a period of 10 minutes without exceeding 10° C. The mixture is then stirred for 30 minutes at room temperature, then it is refluxed for an additional 30 minutes. The excess thionyl chloride is carefully distilled off, then the residue is treated with water and extracted with ethyl ether. The ether extract is separated, the solvent removed and the residue distilled collecting at 135–145° C. under 0.5–0.7 mm. Hg. Yield 5.5 g. (83%) of 3-phenyl-3-ethyl-2,4-azetidinedione. An elemental analysis gave C, 69.69 percent; H, 6.14 percent; N, 7.55 percent. The theoretical figures are C, 69.80 percent; H, 5.85 percent; N, 7.40 percent.

*Example 2*

Into a suspension of α,α-dipropylmalonamic acid (19 g.) in 100 ml. anhydrous benzene, 10 ml. of pyridine and 20 ml. of thionyl chloride are independently and simultaneously dropped over about 30 minutes. The mixture is then refluxed for 1 hour, the excess thionyl chloride is carefully distilled off, the residue is treated with anhydrous diethyl ether, the undissolved pyridine hydrochloride is filtered off and the filtrate is evaporated to dryness. The residue is distilled collecting at 95–100° C. under 0.7 mm. The product is 3,3-dipropyl-2,4-azetidinedione; M.P. 73–75° C.

*Examples 3 to 8*

By the same process as in Examples 1 and 2 the following 3,3-disubstituted 2,4-azetidinediones are prepared, of which the physical properties are given:

3-phenyl-3-methyl, B.P. 130–135° C./0.8 mm.; M.P. 68–70° C.
3-phenyl-3-propyl, B.P. 135–140° C./0.8 mm.; M.P. 61–63° C.
3,3-diethyl, B.P. 80–85° C./0.6 mm.
3,3-dibutyl, B.P. 120–125° C./0.6 mm.; M.P. 65–66° C.
3,3-diisopropyl, B.P. 90–95° C./0.6 mm.; M.P. 46–48° C.
3,3-di-n.amyl-, B.P. 120–125° C./0.2 mm.; M.P. 73–74° C.

Examples 9 and 10 refer to the preparation of compounds of the general Formula II above.

*Example 9*

To a solution of 5 g. of 3-phenyl-3-ethyl-2,4-azetidinedione in 20 ml. of anhydrous diethyl ether a solution of diazomethane in 180 ml. of diethyl ether (freshly prepared from 20.6 g. of nitrosomethylurea) is slowly added with external cooling. The mixture is allowed to stand for some hours, then it is evaporated to a thick oil, which distilled collecting at 105–110° C./0.4 mm. The product is dissolved in 10 ml. of methanol, 4 ml. of water are added and the mixture is cooled until crystallisation is complete. Yield 3 g. of 1-methyl-3-phenyl-3-ethyl-2,4-azetidinedione, M.P. 54–57° C.

*Example 10*

To a solution of 5 g. of 3,3-dipropyl-2,4-azetidinedione in 20 ml. of anhydrous diethyl ether a solution of diazomethane in 230 ml. of diethyl ether (freshly prepared from 25.2 g. of nitrosomethylurea) is slowly added with external cooling. The mixture is allowed to stand for some hours, then it is evaporated to a thick oil, which is distilled collecting at 85–87° C./0.8 mm. The product crystallises from methanol. Yield 3.4 g. of 1-methyl-3,3-dipropyl-2,4-azetidinedione, M.P. 51–55° C.

Examples 11 and 12 refer to the preparation of compounds of general Formula III above.

Example 11

Into a suspension of 3 g. of LiAlH$_4$ in 75 ml. of anhydrous diethyl ether, a solution of 3 g. of 3,3-di-n-propyl-azetidine-2,4-dione in 50 ml. of diethyl ether is dropped with external cooling. The mixture is then refluxed for 3 hours, cooled to —10° and the organic solvent filtered after addition of 15 ml. of a 20% solution of NH$_4$OH. The residue is extracted with diethyl ether, all the ether layers combined, dried over Na$_2$SO$_4$ and evaporated to a thick oil, which is distilled collecting at 85–87° C./20 mm. Yield 1.2 g. (70%). The product is 3,3-di-n-propyl-2,4-azetidine.

Example 12

Into a suspension of 3 g. of LiAlH$_4$ in 75 ml. of anhydrous diethyl ether a solution of 3 g. of 3-phenyl-3-ethyl-2,4-azetidinedione in 50 ml. of diethyl ether is added dropwise with external cooling. The mixture is then refluxed for 3 hours, cooled and after addition of 15 ml. of 20% NH$_4$Cl, filtered. The residue is extracted with diethyl ether, the ether extracts are combined, dried over Na$_2$SO$_4$ and evaporated to dryness. The residue is distilled collecting the fraction boiling at 85–88° C./0.2 mm. Yield 1.32 g. (77.5%) of 3-phenyl-3-ethyl-2,4-azetidine.

I claim:

1. A 3,3-disubstituted-2,4-azetidinedione of the formula:

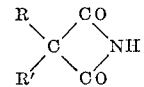

wherein R is lower alkyl and R′ is a member of the class consisting of lower alkyl and phenyl.
2. 3-phenyl-3-ethyl-2,4-azetidinedione.
3. 3,3-dipropyl-2,4-azetidinedione.
4. 3-phenyl-3-methyl-2,4-azetidinedione.
5. 3-phenyl-3-propyl-2,4-azetidinedione.
6. 3,3-diethyl-2,4-azetidinedione.
7. 3,3-dibutyl-2,4-azetidinedione.
8. 3,3-diisopropyl-2,4-azetidinedione.
9. 3,3-di-n.amyl-2,4-azetidinedione.

References Cited in the file of this patent

Chemical Abstracts, vol. 25, page 2418 (1931).
Ebnöther et al., Helv. Chim. Acta, vol. 42, pages 918–955 (1959).